United States Patent [19]

Schloman, Jr.

[11] Patent Number: 4,988,388

[45] Date of Patent: Jan. 29, 1991

[54] FREE-FLOWING GUAYULE RESIN AND BAGASSE MIXTURES AND THEIR USE AS FUEL OR SOIL AMENDENT

[75] Inventor: William W. Schloman, Jr., Stow, Ohio

[73] Assignee: Bridgestone/Firestone, Inc., Akron, Ohio

[21] Appl. No.: 318,270

[22] Filed: Mar. 3, 1989

[51] Int. Cl.$^5$ ............................ C08L 1/02; C05F 5/00
[52] U.S. Cl. ........................................ 106/200; 71/23; 71/903; 71/904; 71/DIG. 1
[58] Field of Search ............. 71/23, 903, 904, DIG. 1; 106/200

[56] References Cited

U.S. PATENT DOCUMENTS

| | | | |
|---|---|---|---|
| 1,753,184 | 4/1930 | Spence | 524/255 |
| 1,753,185 | 4/1930 | Spence | 524/255 |
| 4,678,860 | 7/1987 | Kuester | 44/53 |
| 4,829,117 | 5/1989 | Schloman et al. | 524/378 |

*Primary Examiner*—William R. Dixon, Jr.
*Assistant Examiner*—David M. Brunsman
*Attorney, Agent, or Firm*—Daniel N. Hall

[57] ABSTRACT

Free-flowing particulate compositions matter useful as fuel or soil amendments can be made by impregnating solid particles of guayule bagasse with guayule resins. Processes for making these materials as well as for using them are also disclosed.

3 Claims, No Drawings

FREE-FLOWING GUAYULE RESIN AND BAGASSE MIXTURES AND THEIR USE AS FUEL OR SOIL AMENDENT

INTRODUCTION

This invention was made with Government support under Contract No. 53-3142-7-6005 awarded by the Departments of Defense and Agriculture. The United States Government has certain rights in this invention.

This invention relates generally to resins and bagasse and mixtures thereof derived from guayule plants and more particularly to the use of guayule resin impregnated bagasse and similar materials as fuels or soil amendments.

BACKGROUND OF THE INVENTION

The guayule plant, *Parthenium aroentatum* (Gray), which grows principally in the southwest United States and Mexico is known as a potential domestic source of rubber and organic chemicals. See, for example, the book "Guayule Reencuentro en el Desierto" published by Consejo Nacional de Ciencia y Tecnologia, Saltillo, Coahuila, Mexico (1978) and the magazine "Emergency Management," published by the Federal Emergency Management Agency, Washington, D.C., volume I, no. 4, 1981, pages 4-9. Rubber and other useful organic materials can be obtained from guayule by known processes involving comminuting (grinding) the material and then subjecting it to extraction and/or water flotation. While much attention has been directed to the recovery and processing of elastomeric materials (rubber) from guayule, less attention has been directed to utilization of the other organic materials which can be obtained from these sources such as resin and bagasse. Since large amounts of rubber will probably be recovered from guayule in the future, it is clear that large amounts of other guayule organic products, such as oils, resin and bagasse will also become available. Guayule bagasse is the solid lignocellulosic residue or material left after processing of guayule plant material. Therefore methods for directly using and/or processing these other guayule products to convert them in economically efficient ways to useful products are of increasing interest. The present invention meets these goals.

PRIOR ART

Guayule resin, that is those constituents of the guayule plant obtained when the plant itself or resinous rubber prepared from it is extracted with an organic oxygenated solvent such as acetone, ethyl acetate and the like, has been described as a source of fatty acid and essential oils. (See, for example, U.S. Pat. Nos. 2,744,125 and 2,572,046 respectively.) Steam treatment of guayule plant material has been found to yield various terpene fractions as reported by Haagen-Smit, et al., *J. Amer. Chem. Soc.*, 66,2068 (1944). The above identified book "Guayule" contains a paper by Belmares and Jimenez describing the development of varnishes and adhesives from guayule resin.

U.S. Pat. Nos. 4,136,131 and 4,159,903 to Buchanan and Balman, respectively, describe improved methods for processing guayule plants to provide rubber and enhancing rubber formation in the plant.

The use of thermal and catalytic techniques for processing various petroleum fractions to produce useful liquid and gaseous products are well known. See, for example, The Chemistry of Petroleum Hydrocarbons, edited by Brooks, et al., Reinhold Publishing Corp., NY (1955) particularly Volume II, chapters 22, 23, 24 and 28.

K. W. Taylor (Emergency Rubber Project, Dept. of Agriculture Forest Service Report 2189 (1946: Washington, D.C.) pp 42-44 states that guayule bagasse by itself can be used as an amendment to heavier soils for its lightening effect. Furthermore, Taylor states that guayule leaves removed by parboiling may be used as fertilizer. Taylor does not disclose the use of resin in any such applications.

J. L. Kuester, et al., ("International Conference on Fundamentals of Thermochemical Biomass Conversion (1982: Estes Park, Colo.)," Overend, R. P., et al., Eds., Elsevier Applied Science Publishers, London, 1985, pp. 875-895) report that guayule bagasse and guayule cork are acceptable feedstocks for pyrolysis and catalytic conversion to diesel- and aviation-type fuels. Kuester, et al., do not disclose the use of resin or any combination of resin and bagasse in such an application.

U.S. Pat. No. 1,648,294 to Coolidge relates to a process for impregnating wood with a hard and non-tacky waxy substance as a means of waterproofing the wood and protecting it from decay. Coolidge does not teach a process for surface coating wood with a resinous or gummy material.

U.S. Pat. No. 1,648,295 to Coolidge relates to a process for impregnating wood with an oily preservative, followed by a hard and non-tacky waxy substance to prevent the preservative from migrating to the surface.

U.S. Pat. No. 1,967,990 to Edwards relates to a process for impregnating wood with a preservative oil. Edwards fails to disclose a process for surface coating wood with a resinous or gummy material.

U.S. Pat. No. 2,031,973 to Mudge and U.S. Pat. No. 2,114,377 to Goss relate to processes for impregnating wood and compressed fuel briquettes, respectively, with high-melting wax to prevent deterioration. Neither discloses a process for surface coating wood with a resinous or gummy material and, in so doing, yielding a free-flowing solid product.

D. T. Ray, et al. (*El Guayulero,* 7(3/4), 10-27 (1986)) report that, under irrigated production conditions, guayule will produce about 1.6 tons/ha of rubber, about 1.8 tons/ha of resin, and about 17.9 tons/ha of bagasse (residual biomass). In this specification and claims, ha refers to hectare and tons are metric tons, that is, 1000 kilograms, unless expressly indicated to the contrary. The total yield of non-rubber plant material is about 19.7 tons/ha on a dry weight basis. Thus about 10 kg of resin and bagasse, combined, are produced for each kilogram of rubber and the ratio of resin to bagasse is approximately 1 to 10 by weight. Clearly, it would be beneficial to find ways in which the resin and bagasse can be upgraded to useful materials.

H. M. Benedict (*J. Am. Soc. Aqron.*, 40, 1005–1016 (1948)) observes that, added at up to about 11 tons/ha in the absence of supplemental nitrogen fertilizer, guayule bagasse retards lettuce growth.

U.S. Pat. No. 4,678,860 describes a continuous liquification process to convert biomass materials into diesel types fuels. Among the materials that can be used as feedstocks in this process are raw guayule, guayule resins and guayule bagasse as well as guayule cork.

U.S. Pat. No. 4,376,853 to Gutierrez et al. describes the processing by volatilization and heating of resinous material, extracts and resin from guayule to produce fragmented materials which include organic liquids and gases useful as fuels, lubricants and chemical feedstocks.

The following U.S. Patents describes various types of soil amendments and/or supplements. None, however, describe the use of materials derived from guayule for such purposes. U.S. Pat. Nos. 4,028,088; 4,470,839; 4,539,036; 4,334,906; 4,568,373; 4,229,442; 4,133,668; 4,067,716; 4,056,380.

SUMMARY OF THE INVENTION

It has now been found that materials useful as fuels and soil amendments can be made from resin and bagasse which are both derived as by-products from guayule plant material by processes directed primarily to the recovery of rubber. The resin extract or resins and the bagasse (that is, for the purpose of this description the lignocellulosic residue including cork derived from guayule plants) are combined together to provide useful products. In the combination the proportions of resin and bagasse are often different from that which occurs naturally in guayule plants. Among such products are free-flowing particulate compositions of matter comprising solid particles of the bagasse (waste lignocellulosic material) in admixture with guayule resin. Typically in these admixtures the resin is impregnated in the particles so as to avoid agglomeration. Usually these admixture compositions comprise about 1 to about 60 parts guayule resin per 100 parts bagasse and, more particularly, about 5-60 parts, typically 5 to 35 parts, resin per 100 parts of bagasse. All parts in this application are by weight unless specifically indicated otherwise.

The resin-impregnated bagasse compositions of this invention may be in particle form (having average particle sizes and bulk densities as described hereinbelow) or the particles may be compacted into briquettes, logs, cubes or similar shapes of convenient size for storage, handling and use. The compositions, in whatever form, are useful as fuels, building materials and more typically, in particle form, as soil amendments, plant growth media or fillers. The compositions can contain, in addition to guayule resin and guayule bagasse, other constituents or adjuvants known in the art to be appropriate for their intended particularly use. For example, a guayule resin/bagasse briquette of dimensions of approximately 2-10×10-30×10-30 cm may contain effective amounts of various combustion improvers, smoke surpressants, colorants, ignition improvers and the like. Similar guayule resin - impregnated guayule bagasse particles of, for example, average particle size 15-1 mm, may contain effective amounts of adjuvants such as fertilizer, polyisoprene, molecular weight enhancers, pesticides, plant growth regulators and other similar materials known to the art. The free-flowing particulate compositions of this invention comprised of guayule bagasse impregnated with guayule resin can be used to facilitate plant cultivation, particularly guayule plant cultivation, by adding the composition to the soil at the locus of the plant roots (that is, in and around plots where the plants grow, typically in an area approximately 200 cm or less from the main plant stem).

Included within this invention are processes for preparing a free-flowing particulate composition from particles of guayule bagasse in admixture with guayule resin which comprises the steps of:

(a) dissolving the resin in a solvent or dispersant;

(b) combining the resin solution or dispersant with the bagasse to form a mixture; and (c) removing the solvent or dispersant from the mixture by evaporation or other techniques to recover the resin-bagasse particulate composition as a residue.

In this process the bagasse is usually in the particulate form in which it comes directly from processing guayule plants to recover rubber. If desired, however, the bagasse particle size can be adjusted by appropriate means such as grinding or compaction to provide particles of a chosen size. Usually this process is carried out at room temperature or temperatures ranging from about 15 to 80, typically 20 to 50, degrees centigrade. Often step (c) is done by evaporation at a subatmospheric pressure of about 5-20 kPa and sufficient heat is applied to maintain the mixture temperature at about 30-50 degrees centigrade.

Another technique for forming the free-flowing particulate compositions of this invention from guayule bagasse and guayule resins comprises the steps of:

(a) heating the resin to about 30°-200° C., typically at 60-90° C. to form heated resin of reduced viscosity;

(b) charging the heated resin to a gas powered spray gun apparatus wherein the gas may be air, nitrogen, carbon dioxide, steam, fluorocarbons such as Freon, nitrous oxide, alkanes of 3 or 4 carbons or mixtures thereof;

(c) spraying the resin directly on the surface of the particulate bagasse while agitating the particles to assure uniform application of the resin; and (d) recovering the free-flowing particulate impregnated bagasse composition.

Other techniques are known to those of skill in the art.

FURTHER DETAILED DESCRIPTION OF THE INVENTION

As noted above guayule resin can be obtained by extraction from guayule plants with oxygenated solvents such as acetone, ethyl acetate, tetrahydrofuran and the like) as shown for example in U.S. Pat. Nos. 2,744,125, 2,572,046 and 4,376,853, each of which is hereby incorporated by reference for its disclosures relating to the production of guayule resin. Means for obtaining guayule bagasse are also well known to those in the arts. See, for example, U.S. Pat. No. 4,681,929 to Cole et al., which is hereby incorporated by reference for its disclosures in this regard. Often the bagasse obtained from these processes has a particulate size or an average bulk density which allows it to be used directly in the mixtures of this invention. Bulk densities of less than about 250 to 350 kilograms per cubic meter (ASTM method D-1895-69, method B) are generally useful in the compositions of this invention. Unextracted, ground guayule shrub material can also be used in the resin coated products of this invention. In such cases the fibers plant material are fed to a hammer mill, single-disk attrition (pulp) mill, or a ball mill where they are reduced to a particular size of approximately 10-15 mm or less, preferably a particle size of 1-3 mm or less. This shredding or grinding can be carried out on whole plant. Alternatively the plants can be defoliated by removal of leaves before or after communition. Of course, the ground plant material can be subjected further to simultaneous action of compressive and shear forces as for example by means of differential roll mill or extruder. Similarly guayule bagasse obtained as a residue from various guayule processing techniques, if not already of the desired size, can be converted into particles of the desired size or of the desired bulk density by techniques such as these.

According to the present invention, guayule or guayule-like resins are combined with guayule or bagasse with other wood particles, or mixtures of wood and bagasse. The resulting product is a generally free-flowing solid useful as a soil amendment or material with enhanced fuel value. Typically the resin impregnates the particle from the outside with a substantial portion of the resin absorbed into the particle interior. In most instances, the result is a free-flowing mass of particles exhibiting minimal agglomeration. Often the proportion of resin to bagasse exceeds the proportion found naturally occurring in guayule plants. In plants the proportion of resin to bagasse is usually about 1:10 while often in the mixtures of this invention it is about 3:10, 4:10 or 6:10 or greater on a weight to weight basis. It is surprising that bagasse can absorb up to about 35 parts resin per 100 parts bagasse and remain free-flowing. Generally when the resin-impregnated bagasse particles are free-flowing, they flow under their own weight when, for example, poured from a container. In certain aspects of the inventions, however, it is desirable to take advantage of the inherent tack of the resin to promote particle agglomeration. This true, for example, when its desired to form briquettes, bricks or sheets of the bagasse/resin mixtures of this invention. Loadings of 4:10, 6:10 or higher of resin to bagasse can be used in such applications.

Furthermore, the resin-bagasse product of this invention is suitable for conversion (via pyrolysis, etc.) to hydrocarbon fuels such as aviation or diesel fuel or hydrocarbon feedstocks for chemical processing.

Among the plant materials that can be used as sources of both guayule resins (and guayule-like or guayule type resins) and bagasse are a large number of plant species bearing, producing, and secreting rubber and rubber-like hydrocarbons. These include particularly guayule itself, gopher plant (*Euphorbia lathyris*), mariola (*Parthenium incanum*), rabbitbrush (*Chrysothamnus nauseosus*), candelilla (*Pedilanthus macrocarpus*), Madagascar rubbervine (*Cryptostegia qrandiflora*), Russian dandelion (*Taraxacum kok-saghvz*), mountain mint (*Pycnanthemum incanum*), American germander (*Teucreum canadense*) and tall bellflower (*Campanula americana*). Many other plants which produce rubber and rubber-like hydrocarbons are known, particularly among the Asteraceae (*Compositae*), Euphorbiaceae, Campanulaceae, Labiatae, and Moraceae families.

Guayule resin prepared from such plants is generally extracted with an organic polar solvent. Such polar solvents include alcohols having 1 to 8 carbon atoms, for example methanol, ethanol, isopropanol, octanol and the like; esters having from 3 to 8 carbon atoms such as the various formates, the various acetates, and the like; and ketones having from 3 to 8 carbon atoms, such as acetone, methyl ethyl ketone, and the like. The preferred extraction solvent is acetone or ethyl alcohol. The resin generally constitutes about 6 to about 15 percent of the dry weight of the plant. The resin can be obtained by any conventional extraction method such as solvent extraction of the whole shrub, including the leaves, the woody tissue, and the like. Generally a suitable crush or grinding step is initially utilized, for example, a hammermill. The organic polar solvent can then be added to the crushed guayule plant material to extract the resin therefrom. Naturally, other common or conventional resin extraction methods can be utilized.

The resin can be recovered from the extraction solvent by standard desolventization techniques such as distillation, often under vacuum or with a nitrogen sparge, or by precipitation by addition of a non-solvent for the resin. Once the guayule resin has been extracted, desirably it is physically processed by vacuum or steam devolatilization to further purify it. Devolatilization removes low boiling oils which often cause undesirable odors and excessive softening when present. Combinations of various physical treatments can also be utilized if desired.

While it is often preferred to use desolventized and devolatilized resin in the present invention, untreated resin can be used also in those applications where odor, tackiness and the presence of low molecular weight contaminants are not a problem.

In this embodiment of the invention, the resin-containing effluent from a guayule rubber recovery process is used directly, without desolventization and resin recovery, to impregnate bagasse. For example, the first step of the two step rubber recovery process described in U.S. Pat. No. 4,681,929 yields a miscella comprising a polar solvent (such as a C-1 to C-8 aliphatic alcohol or C-3 to C-8 alicyclic ketone) and about 0.5-5.0, typically about 1-3 percent (weight to weight) resin. Such a resin solution results from extraction of comminuted (i.e., ground or flaked) guayule plant with the polar solvent at say 15-35° centigrade for about 6-24 hours. Examples of such miscella useful in the present invention include an acetone or methanol miscella containing 1-2 percent resin (wt:wt) produced by extraction of flaked guayule at 30° for 24 hours. In such embodiments of the invention, the resin extraction medium also serves as the medium for bagasse impregnation and is removed from the resin-bagasse mixture by standard techniques such as evaporation and the like.

Guayule resin is typically an oil or tacky gum or highly viscous liquid. Guayule resin is reported in the literature to contain a wide variety of components with the most abundant constituents being triterpene ketoalcohols (see Rodriquez-Hahn et al, *Rev. Latinoamer. Quim.*, 1(1) 24–28 (1970)). Another constituent are the diterpene ketoalcohols (see Dorado Bernal et al., *Chim. Ind.* (Paris), 87(5), 612–620 (1962)). Other constituents include polyphenolics and free acids (see Buchanan et al., *J. Am. Oil Chem. Soc.*, 55(9), 657–662 1978)). It may contain noncyclic isoprene oligomers as well.

Among the plant materials to which guayule resin or guayule-type or guayule-like resins can be applied are ground wood and ground leaves. Preferably, the wood is resin- and rubber-free as the result of a suitable extraction step. Leaves may be extracted or unextracted. These materials may be utilized after an initial crush or grinding step in a hammer mill or two-roll mill or flaker. Leaves may be removed from the unground shrub by manual defoliation or parboiling and shaking. Alternatively, leaves may be removed from the ground, unextracted shrub by air classification. The ground wood or ground wood and leaves are generally referred to as bagasse. It can generally be classified as the lignocellulosic component of the plant biomass.

Kuester, et al., (1985), cited above, teach that waste biomass and waste polymeric materials can serve as feedstocks for producing quality liquid hydrocarbon fuels. Such conversion involves gasification to synthesis gas followed by catalytic liquification of the synthesis gas. Typical feedstocks include industrial wastes such as guayule bagasse and guayule cork, and energy crops such as raw guayule. The value of a feed stock is in part related to its heating or fuel value (kJ/kg). All feedstocks are free-flowing solids.

As noted above, in one aspect of the present invention, bagasse is treated by mixing it with a solution of the above extracted guayule resin, and the resulting mixture desolventized. In this instance, it is often possible to use undesolventized resin to make the solution since the solvent is often the same or similar to the solvent used to extract the resin in the first place. Alternatively, bagasse may be treated by spray application of heated, solvent-free resin. Unexpectedly, it has been discovered, in many cases, particularly where the mixture has 30 or less parts resin (per 100 parts bagasse) that the resin-coated bagasse so obtained is generally a free-flowing, millable solid. It is believed this free-flowing property results from the resin soaking into the interior of the bagasse particles. Furthermore, the fuel value of the resin-coated bagasse is greater than that of bagasse itself.

With regard to solution application of the resin, suitable resin solvents and dispersants include hydrocarbons having from about 4 to about 9 carbon atoms such as hexane; cycloalkanes having from about 5 to about 10 carbon atoms such as cyclohexane; aromatic hydrocarbons such as benzene and the xylenes; halogenated hydrocarbons such as methylene chloride and chloroform; alcohols having from 1 to about 8 carbon atoms such as methanol, ethanol, and the like; ethers such as diethyl ether, tetrahydrofuran, and the like; ketones having from 3 to 8 carbon atoms such as acetone and methyl ethyl ketone; esters having from 3 to 8 carbon atoms such as the various formates, acetates, and the like and mixtures of these various classes. A typical solvent choice would be that which is used to deresinate the ground shrub or rubber extracted therefrom. Commercial solvent mixtures such as paint thinner, naphtha, gasoline, Cellosolve and the like can also be used. Generally the resin solutions or dispersions will contain about 1–60 parts resin per 100 parts solvent/dispersant.

The resulting mixture of resin solution and bagasse is processed by desolventization by means of a nitrogen sparge or by distillation (that is, evaporation) at reduced pressure.

The resin can also be applied to the guayule bagasse or other lignocellulosic particles by spray techniques. With regard to spray application of the resin, the application temperature is desirably from 30°–200° C., preferably from 60°–130° C. Generally, this spray process for resin application to bagasse is comprised of the following steps:

(a) Heating the resin to about 30°–200° C., preferably to 60°–90° C. to form heated resin of reduced viscosity;

(b) charging the heated resin to a gas-powered spray gun apparatus wherein the gases are as described above;

(c) spraying the resin directly on the surface of the particles of lignocellulosic material (such as guayule bagasse) while the particles are agitated to assure a substantially uniform application of the resin; and (d) recovering the particulate resin-impregnated bagasse composition.

Typically the gas is air, nitrogen, carbon dioxide, fluorocarbons such as Freons, nitrous oxide, C-3 and C-4 hydrocarbons such as propane and butane, steam or a mixture of two or more of these and about 1 to 60, say 5–35 parts by weight resin is applied per 100 parts by weight lignocellulosic material such as guayule bagasse. In one aspect of this process, the heating step (a) can be replaced or supplemented by a solution step in which the resin is dissolved or stably dispersed in a solvent or dispersant (as described above) to form a solution or dispersant of reduced viscosity. In this aspect a desolventizing step is also included after application of the resin to the bagasse.

The proportions by weight of resin and bagasse in the composition of the invention are typically the range 1–60 parts by weight of resin, typically 5–60 and preferably 5–35 parts by weight of resin to 100 parts by weight of bagasse.

The following not-limiting examples illustrate the preparation of the various resin-coated bagasse compositions of the present invention.

EXAMPLE 1–4

A reactor is charged with 100 parts of bagasse (specific gravity 0.65–0.75) and a solution of resin in about 188 parts of acetone. The resin is produced by the process described in U.S. Pat. No. 4,681,929 (which is incorporated by reference for its disclosures in this regard). The resin has a specific gravity (v. water) of 1.0–1.1., a flash point of about 152° C., a softening point by the ring and ball method (ASTM method E28–67) of less than about 40–50° C., a dark green color and a pine oil odor. The mixture is agitated while the pressure in the reactor was reduced to about 5–20 kPa. A rapid rate of solvent removal is obtained by heating the reactor contents to about 40° C. Heating is maintained until solvent removal is substantially complete.

EXAMPLE 5

Resin (as described in Examples 1–4) is heated to about 80° C., charged to an air-powered spray gun apparatus, and applied directly to the surface of a bagasse sample. The sample is frequently mechanically turned over to assure uniform application of resin.

Table I summarizes the physical characteristics of the resin-coated bagasse compositions so prepared. The products of Examples 1, 2, 3 and 5 are free-flowing solids. The products of Examples 1 and 2 maintain their free-flowing properties even after extensive milling. Furthermore, the products of Examples 2 and 3 are found to have higher fuel values than the uncoated control.

The following Examples illustrate the utility of resin-coated bagasse compositions of this invention as soil amendments:

EXAMPLES 6–9

Two days after germination in horticultural sand, 15 lettuce seedlings (var. Black-Seeded Simpson) are transplanted individually into 16×100 mm test tubes containing 8 g of horticultural sand. The seedlings are maintained under a light bank consisting of two Sylvania F20T12-GRO-WS Gro-Lux lamps set 42 cm above the base of the tubes. Light bank operation is timed to provide 14 hr/day of illumination. For each of five different growth media, a 325-g sample is packed into a 100×50 mm crystallizing dish. Three 7-day old seedlings are then transplanted into each dish. Growth medium is packed carefully around each seedling. The dishes are kept under the light bank for the duration of the study. The seedlings are watered periodically. After 3 days, sufficient 10-20-10 fertilizer is introduced into each dish to provide an equivalent of 2.6 tons/ha. After 9 days, a 1.15 % (w/v) solution of ammonium sulfate is added to provide a solids equivalent of 750 kg/ha. After 28 days, the seedlings are removed from the growth media, washed free of foreign material, and dried in an oven maintained at 110° C.

Table II summarizes the relative average weights of seedlings grown in the various media. Levels of amendment application reported represent the complete recycle of by-product resin in combination with part (Example 9) or all (Example 8) of the by-product bagasse. Seedlings grown in sand containing bagasse (Example 6) weigh 3% more than control seedlings grown in amendment-free sand. Unexpectedly, the seedlings grown in sand containing resin-coated bagasse (Examples 7-9) weight up to 30% more than the controls. From Examples 7 and 8, it is apparent that the increases in weight are greater at higher levels of resin-coated bagasse.

TABLE I

Characteristics of Resin-Coated Bagasse

| Example No. | Parts by Weight Bagasse | Parts by Weight Resin | Fuel Value, kJ/kg | Physical Form Initial | Physical Form Milled[a] |
|---|---|---|---|---|---|
| control | 100 | 0 | 18,443 | free-flowing solid | free-flowing solid |
| 1 | 100 | 9.6 | — | free-flowing solid | free-flowing solid |
| 2 | 100 | 14.5 | 19,927 | free-flowing solid | free-flowing solid |
| 3 | 100 | 28.6 | 22,944 | free-flowing solid | free-flowing solid |
| 4 | 100 | 57.1 | — | tacky solid | — |
| 5 | 100 | 9.4 | — | free-flowing solid | — |

[a]Samples ball milled 16 hr.

TABLE II

Effect of Resin-Coated Bagasse on Seedling Weight

| Example | Amendment | Level, tons/ha[a] | Relative Dry Weight[b] |
|---|---|---|---|
| control | — | — | 1.00 |
| 6 | bagasse | 20.1 | 1.03 |
| 7 | Example 1 | 11.0 | 1.06 |
| 8 | Example 1 | 22.1 | 1.22 |
| 9 | Example 2 | 15.3 | 1.30 |

[a]1.0% wgt/wgt amendment in sand equivalent to 25.1 tons/ha added to 15-cm depth.
[b]Control seedling dry weight (average of three values): 4.1 mg.

It will be understood that the examples given above are for illustrative purposes only and in no way limit the scope of the invention. Modifications in the materials and procedures employed both for making the compositions of this invention and using them as well as the conditions in such processes will be apparent to those of skill in the art and are within the scope of the invention.

What is claimed is:

1. A soil amendment comprising, a free flowing particulate composition of matter comprising solid particles of quayule bagasse impregnated with quayule resin wherein the composition comprises about 5 to about 35 parts by weight quayule resin per 100 parts by weight quayule bagasse and, effective amounts of adjuvants selected from the group consisting of fertilizers, polyisoprene molecular weight enhancers, pesticides, plant growth regulators, and mixtures thereof.

2. A growth medium for plants comprising 99.0 to 99.7 weight percent sand, soil or mixture thereof and 1.0 to 0.3 weight percent of the composition of claim 1.

3. The composition of claim 1 wherein the particulate composition has an average particle size of about to 15 mm to 1 mm or a bulk density of less than 250 to 350 kilograms per cubic meter.

* * * * *